Jan. 14, 1964 — A. E. HELBLING — 3,117,578
DOCKING IRON
Filed May 5, 1961 — 2 Sheets-Sheet 1

INVENTOR
Anton E. Helbling
BY Robert E. Kleve
ATTORNEY

Jan. 14, 1964  A. E. HELBLING  3,117,578
DOCKING IRON

Filed May 5, 1961  2 Sheets-Sheet 2

INVENTOR
Anton E. Helbling
BY Robert E. Klein
ATTORNEY

United States Patent Office 3,117,578
Patented Jan. 14, 1964

1

3,117,578
DOCKING IRON
Anton E. Helbling, 408 E. Main St., Mandan, N. Dak.
Filed May 5, 1961, Ser. No. 108,073
1 Claim. (Cl. 128—303.14)

This invention relates to cutting and cauterizing tools and equipment, more particularly the invention relates to electric docking tools employed in the livestock industry for amputating animal tails of lambs and other animals, for simultaneously heating, searing or cauterizing of the severed stub of the animal tail to assist in blood coagulation and closure of the blood vessels in the area of the amputation.

While docking tools have been employed in the past with electric heating structure for cutting and cauterizing the severed end of the animal's tail, past experience however with these prior devices has not proved entirely satisfactory since, for example, in some instances the tools required a relatively large amount of manual effort or force to produce the cut, and/or in other instances failed to cut off rapidly and efficiently. In addition, these previous devices have suffered from a variety of other short comings.

Accordingly, it is an object of this invention to overcome these prior deficiencies and to provide a novel, improved heating and cutting mechanism and to provide a more rapid, even cutting and cauterizing operation.

It is another object of the invention to provide a novel docking iron having an anvil and blade for the cutting action, and a removable heating cartridge mounted within the blade for cauterizing the object being cut.

It is a further object of the invention to provide a novel, improved docking iron which employs a leverage cutting action, whereby the cutting is produced with a minimum amount of applied force.

It is another object of the invention to provide a novel scissor pliers cutting action in an electric docking iron with vise type of jaw movement and with the heating element blade being pivotally mounted for improved cutting and severing.

It is another object of the invention to provide a detachable heating element in one of the cutting jaws, and a mechanism for mounting and operating the cutting action whereby the heated blade's cutting edge may tend to assume general parallelism with the working surface of the anvil jaw, when the blade and jaw are closed together, irrespective of the wear upon the jaw and blade after extended use.

It is another object of the invention to provide a pair of cooperating jaws pivotally mounted for movement toward and away from one another with one of the jaws being pivotally mounted at a location centrally and generally opposite of the other jaw so that the object being severed may be more firmly and efficiently introduced between the jaws for the severing action.

Additional and further objects and advantages to the invention will become apparent as the description proceeds, and when taken in conjunction with the accompanying drawings wherein.

Figure 1:
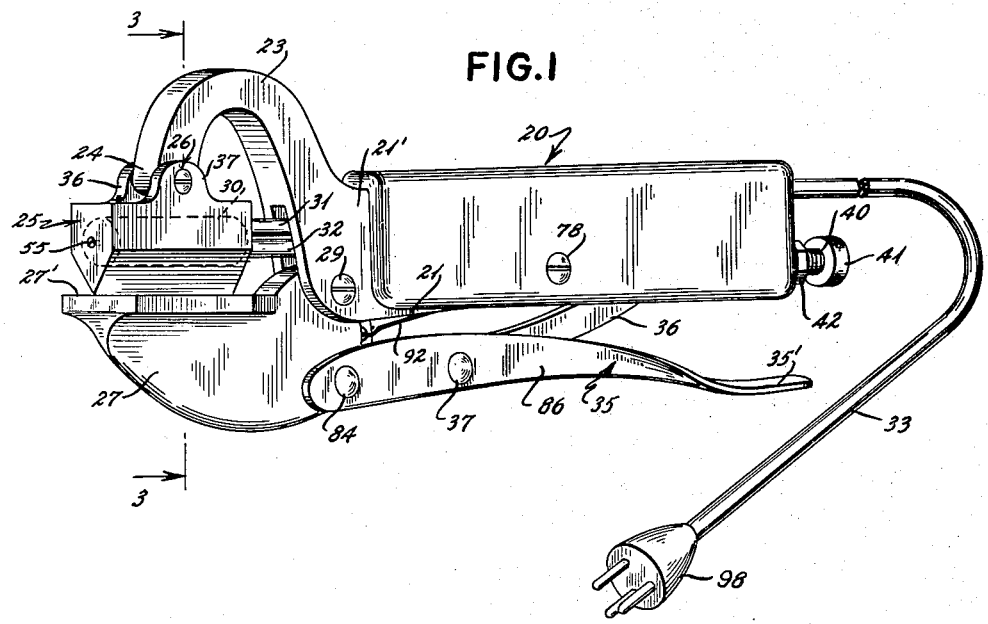
FIG. 1 is a perspective view of an electric docking iron made according to the invention illustrating the electrical cutting blade and movable anvil jaw of the docking iron in their closed engaged position.
Figure 2:
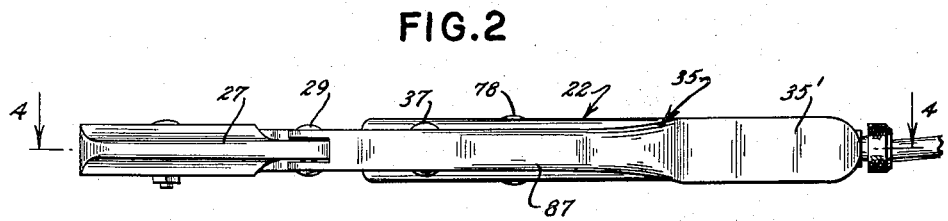
FIG. 2 is a bottom plan view of the device of the invention.

Briefly stated, the invention is an improved electric docking iron for cutting and simultaneously cauterizing animal tails, the iron comprising an elongated handle, having a cutting blade pivotally mounted, intermediate its length, to the forward end of the handle, and pivotable about an axis transversely of the length of the handle. Within the pivoted cutting blade, is a detachably mounted electric heating cartridge for heating the blade to produce a severing cauterizing effect upon the animal's tail as the blade cuts the tail. An anvil jaw is pivotally mounted transversely to the handle having a working surface adapted to engage the cutting edge of the blade, in generaly flush relationship. The anvil jaw has a working surface relatively broad with respect to the cutting edge of the blade, to assure a more positive, perpendicular cutting action against the animal's tail. The blade is pivoted intermediate its length to enable the blade to adjust to position its cutting edge in a more nearly parallel relation to the plane of the working surface of the jaw then would exist if the blade was not pivoted. This increases the effectiveness of the cutting and cauterizing action. The invention further includes a flexible electrical lead connection extending from the rear of the cartridge to the handle of the tool. The tool is also provided with an actuating lever pivotally mounted to the anvil jaw for moving the jaw toward the blade and an intermediate thrust linkage plate pivotally connected to the lever and handle, whereby when the actuating lever is pivoted toward the handle, the linkage forces the anvil jaw toward the blade with a greater leverage force at the end of the stroke to thereby enable an easier cutting action, with less applied force being necessary.

With further more detailed reference to the drawings, an electric docking iron 20 utilizes a pliers type of cutting action and includes an elongated metal body 21, having an elongated handle 22 fixedly mounted to and encompassing the body. An arcuate hook shank portion 23 projects forwardly from the metal body and handle, along a curved trajectory with the nose portion 24 terminating transversely toward the longitudinal axis of the body. An electric cutting and cauterizing blade 25 is pivotally mounted, transversely of the handle, to the nose portion 24 of the hook shank portion 23, as at 26, and includes a substantially straight cutting edge 26' extending generally parallel to the longitudinal axis of the handle. The pivot point 26 is disposed above the blade, and intermediate its length thereof.

An anvil jaw 27 is pivotally mounted to the forward portion 21' of the metal body, by means of a screw or rivet 29 and is provided with a flat, broad working surface 27' immediately beneath the cutting edge of the blade 25, and perpendicular thereto. Within the cutting blade 25, is a detachably mounted heating cartridge 30, of a straight, cylindrical shape (FIG. 3) for heating the cutting blade to provide the searing and cauterizing of the animal's tail. Extending rearwardly from the cartridge are a pair of flexible insulated electrical lead wires 31 and 32, which extend into the handle and become a part of a power supply cord 33. With the handle is a cord strain relief spring 34 (FIGS. 4 and 5) for fixing the position of the cord and leads, relative to the cartridge.

At the rear of the anvil jaw 27, is a pivotally mounted, elongated actuating lever 35, pivotally mounted on a transverse axis to the length of the handle, and extending rearwardly and diverging outwardly from its pivotal joint. The actuating lever 35 acts to pivot the anvil jaw against the cutting edge of the blade, by cooperating with a thrust linkage plate 36. This plate 36 is pivotally connected at one end by a rivet 37 to the intermediate portion of the lever, and at the other end by a rivet 38 to a forward end 39 of a threaded shank 40 at an intermediate point within the handle, with their axes transversely of the length of the handle. The threaded shank 40 is adjustably threadably supported in a threaded sleeve member 76 forming a part of the body 21. The lever 35 is pivoted to the anvil jaw as at 84.

The linkage plate 36 provides a leverage action to the movement of the lever 35, in pivoting the jaw against the blade. At the rear, remote end of the shank 40, and projecting from the rear of the handle of the tool, is a knurled adjustment knob 41, and a lock nut 42, which act to adjust the shank 40, and accordingly the pivot connection 38, forwardly and rearwardly along the length of the length of the handle, to thereby adjust the relative size of the opening or space between the blade and anvil jaw with respect to the positioning of the lever 35. The pivot connection is also provided with a second pivot 43, coinciding with the longitudinal axis of the shank, and acting as a universal joint, so that the shank may be screwed forwardly and rearwardly without changing the angle of the axis of the pivot 38.

The heated blade 25 provides the heating and cutting action for the tool, and is preferably manufactured of aluminum bronze material, with a triangular, lower cross-sectional configuration with opposed, evenly tapered surfaces 44, 45, which converge downwardly toward one another to form the cutting edge 26'. The blade 25 acts as a receptacle for the heating cartridge 30, having a straight elongated cylindrical bore 46 (FIG. 3, 4 and 6) extending longitudinally of the blade and parallel with the cutting edge 26', wherein the straight cylindrical heating cartridge 30 is slidably and detachably inserted or mounted for heating the blade.

A pair of parallel, upright lugs 47 and 48, project upward from the top of the blade and are formed integrally therewith. These lugs include apertures 49 and 50, respectively, in coaxial alignment which cooperate with a central mounting eyelet or aperture 51, in the nose 24 of the curved shank, to provide the pivot point between the shank of the tool and the blade. A threaded bolt 52 is inserted into the spaced apertures 49 and 50 of the mounting lugs and into the eyelet 51, to form the pivot 26 retaining the cutting blade to the nose of the shank, and a nut 53 is threaded onto the remote end of the bolt 52 to retain the bolt in place.

At the forward end of the cutting blade is a threaded aperture 54 of a reduced size or diameter and communicating with the enlarged cylindrical bore 46, with a screw 55 threadably mounted thereto. The reduced aperture 54 facilitates the removal and exchange of a heating cartridge from the blade in the event of a burnout. The cartridge is removed by detaching the blade from the pivot 26 to the shank of the tool, whereupon the screw 55 is removed, and a rod is then introduced into the aperture 54 to force the cartridge rearwardly out of the blade.

Figure 3:
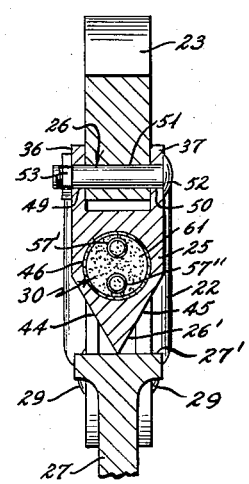
FIG. 3 is a front cross-sectional view of the electric docking iron taken along line 3—3 of FIG. 1, and illustrating the cross-sectional interior of electric heating cartridge, and the manner of cutting engagement of the blade with the anvil jaw.
Figure 4:
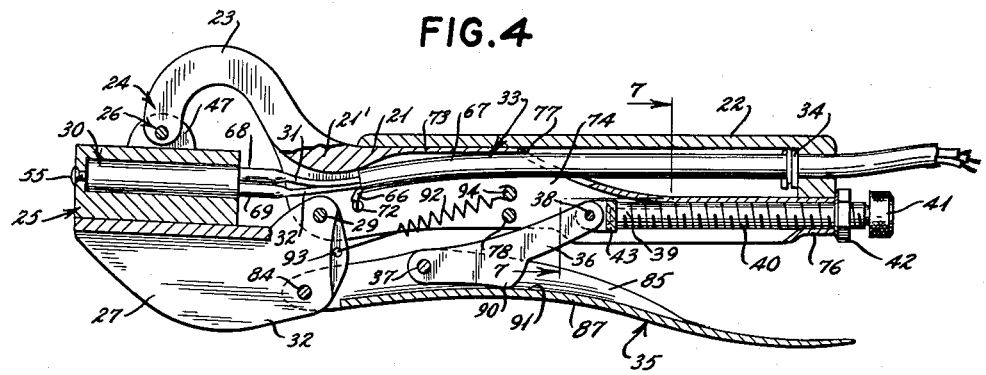
FIG. 4 is a longitudinal cross-sectional view of the device taken along line 4—4 of FIG. 2, and illustrating blade and jaw and in their closed position, with portions of the iron broken away to reveal the interior details.
Figure 5:
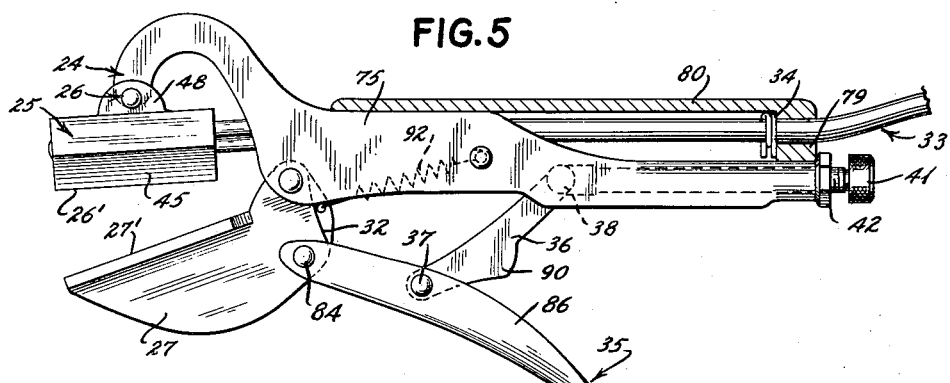
FIG. 5 is a longitudinal side elevational view of the device of the invention as seen in FIG. 4 but with the parts in a different position with respect to each other, parts being in section and parts being broken away.
Figure 6:
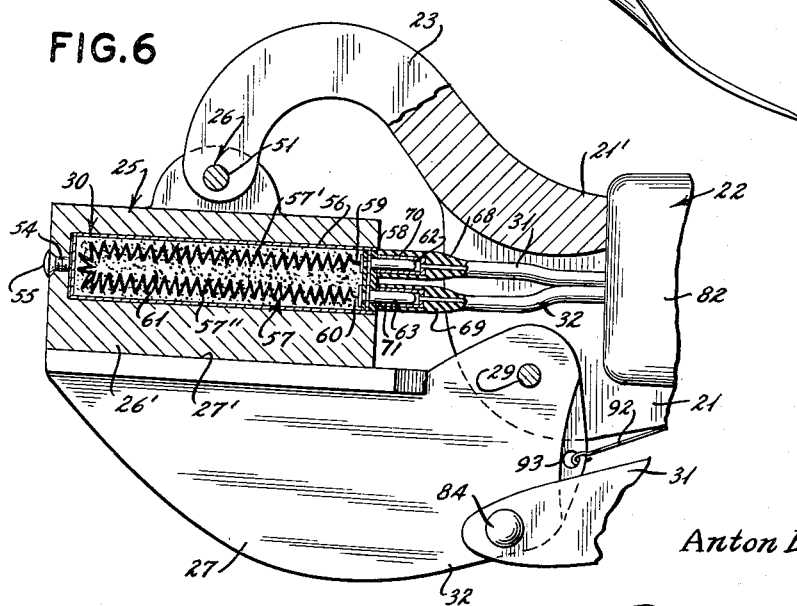
FIG. 6 is an enlarged fragmentary view of the cutting blade and anvil jaw and associated forward portion of the tool, with portions of the heater cartridge, metal body flange, and etc. broken away.

The heating cartridge 30 illustrated in FIGS. 3, 4 and 6 comprises a cylindrical sheath 56 forming a container for the cartridge, a coiled resistor 57, having a hair pin configuration, with the coil reversely bent in the middle, and with the legs 57' and 57" extending rearwardly and parallel along the length of the cartridge to a disc cap 58 with the remote ends 59 and 60 of the resistor 57 terminating at the rear of the cartridge. Insulating powder 61 fills the remaining space within the cartridge, surrounding the insulating the resistor coil 57 from the sheath 56.

Various other types of heating cartridges may be employed in lieu of the one shown, for example, another cartridge suitable for utilization with the blade comprises a single coil disposed axially along the length of the sheath, with the forward end of the coil projecting or looping back through the center of the coil to the rear of the cartridge so that both ends of the coil also terminate adjacent the rear of the cartridge.

At the rear of the cartridge are a pair of elongated metal prongs 62 and 63 mounted to the disc cap 58 at the rear of the cartridge and projecting longitudinally, rearwardly, in parallel relation. The inner ends of these metal prongs are electrically connected or soldered to the remote ends 59 and 60, respectively, of the resistor coil.

The power supply cord 33, passes lengthwise through the handle of the tool, having insulated wires 31, 32 and a third wire 66, all three of which are enclosed in a rubber sheath 67, and with two of the insulated wires 31 and 32 projecting forwardly of the handle between the flanges of the metal body to the rear of the heating cartridge. Electric sockets 68 and 69 are mounted to the forward ends of the wires 31 and 32, with metal sleeves 70 and 71, slidably and detachably mounted to the metal prongs 62 and 63 of the cartridge, thereby providing an electrical connection for the remote ends of the resistor coil to the wires 31 and 32 of the power supply cord. At the rear of the power supply cord is a plug 98 for connecting the cord to a source of electric current.

The third wire 66 is connected to the metal body by means of a screw 72 and provides a safety ground for the operation of the tool.

As the broad, flat lateral working surface 27' is brought up toward the cutting edge 26' of the cutting blade 25 with an animal tail between the two, the blade will be free to pivot about the axis 26 when both the surface 27' and 26' first touch the tail.

Assuming the tail is generally on a line perpendicular to the working surface 27' which passes through the center of pivot 26', the blade will move to position the cutting edge 26' substantially parallel to the surface 27' and will move about the pivot 26 to maintain this parallel relationship throughout the cutting and searing operation. This is the optimum condition and the operator using the iron will always attempt to so aline the tail to be cut.

Assuming, however, that the tail is contacted closer to the handle than in direct alinement with the pivot point 26, the blade will still pivot to move toward the parallel relationship thus causing the maximum possible force to be exerted toward cutting the tail and the minimum possible toward tending to force the tail longitudinally out from between the cutting blade edge 26' and the anvil working surface 27'.

In the event the tail is unalined in either direction with respect to pivot 26, the blade can rotate only until it is stopped, either by the inherent construction of the lugs 47 and 48, the nose portion 24, and the top of blade 25, or until the cutting edge 26' contacts the anvil working surface 27'. At that point forces on the tail will tend to be directed increasingly toward a line perpendicular with said surface and decreasingly toward a direction to tend to cause the tail to be forced out from between the cutting edge and the working surface. Since no appreciable forces except in perpendicular direction can be developed until the rotation of the blade is stopped, the only significant forces ever developed is in the optimum cutting direction, namely—in perpendicular relationship to anvil surface 27'.

The pivoted blade and jaw cooperate further with one another to provide a rapid quicker and more effective cutting and cauterizing of the animal's tail, as the blade pivot 26 being located intermediate the length of the blade facilitates the adjustment of the blade's cutting edge into generally flush conformity with the working surface of the anvil jaw, from their forward ends to their rearward ends, thereby enhancing the overall cutting operation. This enables a more intimate contact with the animal's tail in spite of the wear upon the linkage and tends to assure a complete cut, since if the blade were not pivoted it would be possible for the blade and jaw to touch at one end and gap at the other end, after extended wear and usage.

The electrical leads 31 and 32, extending into the cartridge of the blade, also tend to facilitate the cutting action, since they are relatively taut and accordingly will tend to prevent the blade from pivoting too great an extent.

Also, by using an anvil in cooperation with the blade, rather than another opposing blade with tapered surfaces such as 44 and 45 of a substantial height, substantially the entire thickness of the animal's tail may be effectively cauterized, with only the one blade 25 being heated.

The metal body 21 including the shank 23 may be formed as a single piece, and includes a top roof portion 73, with integrally formed side flanges 74 and 75, depending downwardly in spaced parallel relation. The rearward portion of the body curved into a cylindrical threaded sleeve member 76 to provide a socket for a threaded shank 40 of the adjustment knob 41. An aperture 77 is also provided near the top of the body, to allow the power supply cord to pass through. Except for the forward portion of the body 21 and the curved shank or hook 23, substantially the remainder of the metal body is contained with the handle 22 and is fixed thereto by a screw and bolt connection 78.

The handle 22 is formed of insulating material, preferably wood or a suitable plastic and includes a barrel portion 79, with an integrally formed elongated top rib portion 80, and elongated side walls 81 and 82 which depend in spaced parallel relation from the barrel and rib portion. The walls 81 and 82 snugly envelop and encompass the roof and side flanges of elongated body portion 21 of the docking tool.

Figure 7:
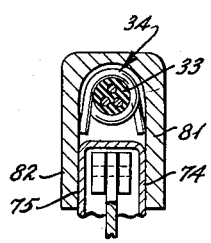
FIG. 7 is a cross-sectional view taken along line 7—7 of FIG. 4, illustrating the details of the cord strain relief structure.

Within the wooden handle 22, adjacent the barrel portion 79, is a strain relief spring 34 which provides a strain relief for the power supply cord 33. The strain relief spring 34 is a single length of resilient wire, a coil in its central portion, and with the remote ends of the wire diverging outward, to form leg members. The strain relief spring is attached by inserting the cord 33 into the coiled portion, and compressing the legs together to crimp the coil to the cord. Thereafter the cord may be inserted between the side flanges of the metal body and the strain relief spring will abutt the forward face of the barrel portion 79, thus to prevent the cord from being drawn out through the barrel, while the legs, as best illustrated in FIG. 7, will laterally engage the side flanges, and prevent twisting or turning of the cord, with respect to that portion with the handle, and the leads connected to the heater cartridge, as well as the ground connection. The strain relief spring thus prevents the power supply cord from pulling away from its connections.

The actuating lever 35 is made of sheet metal having integrally formed side flanges 85, and 86 and a narrow base 87. The actuating lever diverges outwardly and rearwardly from its forward riveted pivotal connection 84, with the outer end of the lever 35 being flared or broadened laterally to offer an enlarged surface for the operator's hands to engage when manipulating the lever.

The elongated thrust linkage plate 36 is provided with an intermediate projection 90, which acts to engage the inner face 91 of the base 87 of the actuating lever, when the actuating lever is pressed toward the handle, for pivoting the jaw against the blade.

A spring 92 under tension is connected at one end to an aperture 93 at the rear of the anvil jaw and at the other end to a post 94 in the middle of the handle, and acts to draw the anvil jaw backward. Consequently at the end of each cutting stroke with the iron, even though the jaw is moved fully against the cutting blade, the spring 92 will tend to pivot the anvil jaw back away from blade and thereby opening the anvil jaw from the position illustrated in FIG. 4 to the position illustrated in FIG. 5 to ready the iron for another docking and cauterizing action.

It should be apparent that the iron includes numerous facilities in addition to those specifically described, and that it be made to be adapted to a variety of useful purposes.

It will be obvious that various changes may be made in the invention without departing from the spirit and scope thereof and that accordingly it is not intended that the invention be limited to that which is specifically described in the specification and illustrated in the drawings, but only as set forth in the appended claim.

What is claimed is:

A docking iron including an elongated body, a hook-shaped shank integrally mounted with respect to said body and extending from a first end of said body outwardly in a first plane passing through a longitudinal axis of said body, an outer forward end of said shank terminating at a position spaced from said body but in longitudinal alinement with it, an anvil jaw pivotally mounted to said body on a jaw pivot axis perpendicular to said first plane, said anvil jaw being partially defined by a flat, relatively broad anvil working surface in facing relation to said outer forward end of said shank and lying in a second plane perpendicular to said first plane and parallel to said jaw pivot axis, a cutting and cauterizing blade pivotally mounted to said outer forward end of said shank on a blade pivot axis perpendicular to said first plane and parallel to said second plane and said jaw pivot axis, said blade being partially defined by first and second mutually converging surfaces which intersect to form a cutting edge lying in said first plane and in facing relation to said anvil surface, said blade pivot axis being spaced from said cutting edge but lying in a plane perpendicular to said edge and passing through the midpoint of said edge, said blade being capable of pivotal movement with respect to said blade pivot axis to permit said edge to maintain a parallel relationship with respect to said anvil surface as said anvil moves to and from a closed position where said anvil surface is in contact with said cutting edge throughout the length of said edge and an open position where said anvil surface is spaced from said edge, means to forceably move said anvil jaw from said open to said closed position, means to heat said blade to a sufficient temperature to cauterize living tissue as it is cut by said blade, said heating means being constituted as an electric heating cartridge encompassed by said blade, a passageway longitudinally through said body, and an insulated electric power supply cord extending from said cartridge and through said body passageway, said power supply cord being fixedly mounted with respect to said body in taut relationship to said cartridge and said blade to tend to maintain the blade in position to cause said cutting edge to be in parallel relationship with respect to said anvil surface.

References Cited in the file of this patent
UNITED STATES PATENTS

| | | |
|---|---|---|
| 1,763,894 | Lagier | June 17, 1930 |
| 2,592,803 | Heim | Apr. 15, 1952 |
| 2,604,803 | McCann | July 29, 1952 |
| 2,719,904 | Treis | Oct. 4, 1955 |
| 2,930,376 | Rathmann | Mar. 29, 1960 |